(12) United States Patent
Hu et al.

(10) Patent No.: US 10,645,049 B2
(45) Date of Patent: May 5, 2020

(54) PROXY EMAIL SERVER FOR ROUTING MESSAGES

(71) Applicant: Microsoft Technology Licensing, LLC, Redmond, WA (US)

(72) Inventors: Xin Hu, San Jose, CA (US); Raghu Ram Hiremagalur Venkatesh, Fremont, CA (US); Mohak Shroff, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 16/013,592

(22) Filed: Jun. 20, 2018

(65) Prior Publication Data

US 2018/0302361 A1 Oct. 18, 2018

Related U.S. Application Data

(63) Continuation of application No. 14/869,795, filed on Sep. 29, 2015, now Pat. No. 10,122,663.

(Continued)

(51) Int. Cl.
*G06F 15/173* (2006.01)
*H04L 12/58* (2006.01)
*H04W 4/14* (2009.01)

(52) U.S. Cl.
CPC .......... *H04L 51/18* (2013.01); *H04L 51/063* (2013.01); *H04L 51/28* (2013.01); *H04L 51/32* (2013.01); *H04W 4/14* (2013.01)

(58) Field of Classification Search
USPC ........................................................ 709/206
See application file for complete search history.

(56) References Cited

U.S. PATENT DOCUMENTS 6,489,950 B1 * 12/2002 Griffin ................. G06F 1/1626
 345/168
9,753,921 B1 9/2017 DeVincenzi et al.
(Continued)

FOREIGN PATENT DOCUMENTS

EP 2744158 A1 6/2014
GB 2488332 A 8/2012
WO WO-2017039799 A1 3/2017

OTHER PUBLICATIONS

"U.S. Appl. No. 14/869,795, Non Final Office Action dated Oct. 10, 2017", 10 pgs.

(Continued)

*Primary Examiner* — Thanh T Nguyen
(74) *Attorney, Agent, or Firm* — Schwegman Lundberg & Woessner, P.A.

(57) ABSTRACT

In various example embodiments, a system and method for generating a proxy email address for routing messages are presented. An email directed to a user with a proxy email address assigned by the system and with no registered email address is received at a proxy email address. Whether or not the email contains an action message identifier is ascertained. Based on the email containing an action message identifier, a forward email is identified. Text content from the forward email is extracted. A short message based on the extracted text content is generated. At least one communication channel to send the short message is selected based on an engagement level associated with the at least one communication channel. The short message may be caused to be presented at a mobile device associated with the user via the selected communication channel.

20 Claims, 10 Drawing Sheets

Related U.S. Application Data

(60) Provisional application No. 62/212,533, filed on Aug. 31, 2015.

(56) References Cited

U.S. PATENT DOCUMENTS

| | | |
|---|---|---|
| 9,984,428 B2 | 5/2018 | Doyle et al. |
| 2002/0013854 A1 | 1/2002 | Eggleston et al. |
| 2003/0013854 A1* | 1/2003 | Anderson .............. C07K 16/30 530/387.3 |
| 2006/0031334 A1* | 2/2006 | Kim ..................... H04L 51/066 709/206 |
| 2007/0150387 A1* | 6/2007 | Seubert ................. G06Q 10/10 705/31 |
| 2011/0106617 A1 | 5/2011 | Cooper et al. |
| 2011/0302096 A1* | 12/2011 | Lowry ............... G06Q 30/0185 705/318 |
| 2011/0303096 A1 | 12/2011 | Lin |
| 2012/0258742 A1 | 10/2012 | Kafka et al. |
| 2015/0142897 A1* | 5/2015 | Alten ..................... H04L 51/36 709/206 |
| 2015/0341290 A1* | 11/2015 | Cherifi ................. H04L 51/043 709/206 |
| 2017/0063763 A1 | 3/2017 | Hu et al. |
| 2017/0300483 A1 | 10/2017 | Devincenzi et al. |

OTHER PUBLICATIONS

"U.S. Appl. No. 14/869,795, Notice of Allowability dated Apr. 18, 2018", 2 pgs.

"U.S. Appl. No. 14/869,795, Notice of Allowance dated Apr. 3, 2018", 10 pgs.

"U.S. Appl. No. 14/869,795, Response filed Feb. 12, 2018 to Non Final Office Action dated Oct. 10, 2017", 12 pgs.

"International Application Serial No. PCT/US2016/039602, International Preliminary Report on Patentability dated Mar. 15, 2018", 8 pgs.

"International Application Serial No. PCT/US2016/039602, International Search Report dated Sep. 14, 2016", 4 pgs.

"International Application Serial No. PCT/US2016/039602, Written Opinion dated Sep. 14, 2016", 6 pgs.

"Notice of Allowance Issued in U.S. Appl. No. 14/869,795", dated Jun. 29, 2018, 10 Pages.

* cited by examiner

PROXY EMAIL SERVER FOR ROUTING MESSAGES

CROSS-REFERENCE TO RELATED APPLICATIONS

This application is a continuation of U.S. application Ser. No. 14/869,795, filed Sep. 29, 2015, and claims the priority benefit of U.S. Provisional Application No. 62/212,533, filed Aug. 31, 2015, which applications are incorporated herein by reference in their entirety.

TECHNICAL FIELD

Embodiments of the present disclosure relate generally to proxy servers and, more particularly, but not by way of limitation, to proxy email server for routing messages.

BACKGROUND

Currently, many social networking service providers primarily rely on email as the communication channel to engage with members. As a result, the back end infrastructure (e.g., servers, applications, and databases) of these social network service providers heavily depend on a member's email address for a variety of purposes including, communication, transactional engagement, identity representation, etc. Therefore, people who do not possess an email address do not have access to the services of these social network service providers or in other cases very limited access with limited user experiences. This is especially true for the non-western world where the majority do not have email, but rather primarily use mobile phones as the channel of network connection and communication. As such, there is a need to provide a full user experience for people who do not have emails without necessitating a complete restructuring of the back end infrastructure of a social network service provider system.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
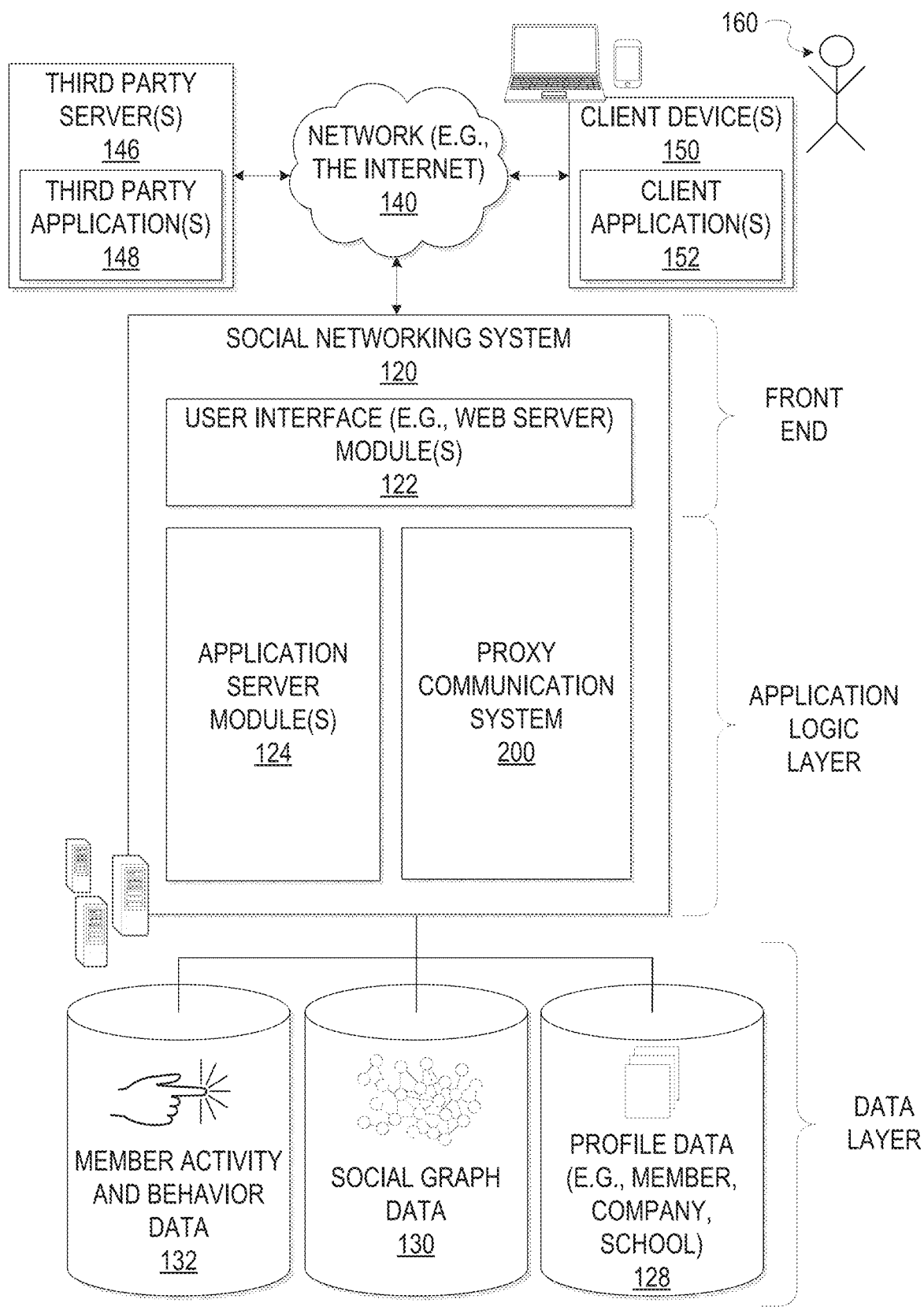
FIG. 1 is a network diagram depicting a client-server system within which various example embodiments may be deployed.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, the features of the present disclosure provide a technical solution to the technical problem of providing potential members without an email address a full user experience of social network services, where the back end infrastructure of the social network service providers primarily depend on a member's email address as the primary channel for various transactions (e.g., communication channel, transactional engagement, identity representation, log-in, sign-in, and the like). Current back end infrastructures depending on a member email to function as intended include, for example, sign-up, log-in, transactional engagement, job application, and the like. For instance, current users are required to have an email in order to sign-up as a member of the system. Also, current members are required to have an email in order to log-in to their member profile. Further, transactional engagements (e.g., a member invites another members to connect) with members currently heavily depend on email as the primary channel of notification of these transactional engagements. Moreover, a member is required to have an email in order to apply for a job via a job portal (e.g., for example, LinkedIn). Therefore, potential members who do not have an email address is unable to utilize the functionalities requiring an email address. Accordingly, in some embodiments, generating a proxy email address for members who do not possess an email satisfies the flow dependencies of the back end infrastructure. In example embodiments, a proxy communication system provides the technical benefit of assigning a proxy email address to phone-only members (e.g., members who sign up using a phone number and therefore do not have or do not use a personal email), thus allowing the phone-only members to have the full services provided the network service providers without necessitating a change in the back end infrastructure dependencies on member emails. As a result, having a proxy communication system avoids the substantial time, cost, resources, and effort to migrate the back end infrastructure away from being email dependent in order to accommodate phone-only members.

In various example embodiments, the features of the present disclosure provide a technical solution to the technical problem of determining a communication channel with phone-only members to maximize member engagement with the communication. The proxy communication system provides, in some embodiments, the technical benefit of determining a channel of communication to actively engage phone-only members. Phone-only members can access the services provided by the social network service providers via mobile devices, wearable devices, smart devices, and the like. Due to the nature of these devices, active engagement and communication with the users of these devices differ from sending out emails to engage and communicate with a member via traditional email. These devices are typically smaller with less space for showing text-based messages and they are intimately connected with the user because their mobile nature allows them to be in constant contact with the user. Further, with mobile devices, there exist various channels to communicate with the user including, push notification, instant messenger (IM), short message services (SMS), and other messaging applications (e.g., WhatsApp, WeChat, and the like). User interactions with these types of mobile devices have shifted from longer, more lengthy messages to short and quick messages via these various channels. As a result, the proxy communication system can be used to determine which communication channel would maximize active engagement with phone-only members along with converting an email message, intended for the phone-only member, to a shorter message appropriate for a mobile device to be sent via the determined communication channel. Thus, the proxy communication system provides the benefit of a full and coherent user experience with the social network service provider, accommodating for the member's end communication device and lack of email address, while maintaining the back end infrastructure of the social network service provider system.

In various embodiments, systems and methods for generating a proxy email address for routing messages are described. When a member initially registers to access social networking services using a phone number, rather than a traditional email, a proxy communication system 200, part of a social networking system 120, assigns the member a unique proxy email address and a unique member identifier. Emails generated by the social networking system 120 to be sent to the member is received by the proxy communication system 200, identified to be critical (e.g., important and therefore to be forwarded), and if important the textual content of the email is extracted and a short message is generated from the email. Further, a communication channel is selected to send the short message to the member's mobile device based on member activity. The short message is then presented at the mobile device associated with the member via the selected communication channel.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include a proxy communication system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
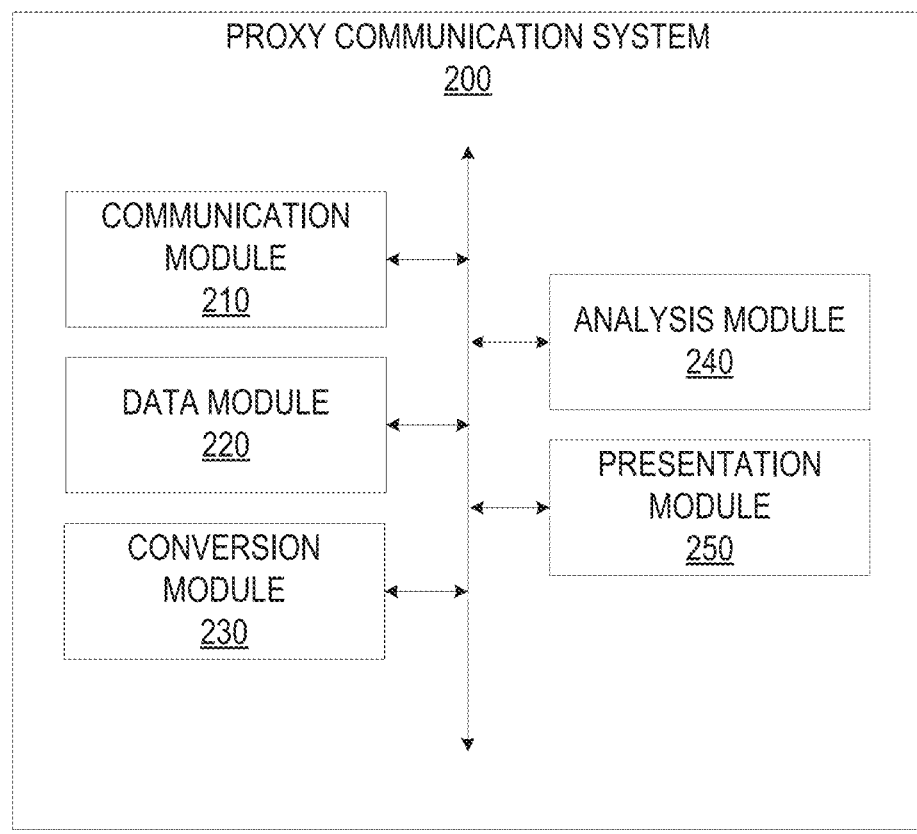
FIG. 2 is a block diagram illustrating an example embodiment of a proxy communication system, according to some example embodiments.

FIG. 2 is a block diagram illustrating components provided within the proxy communication system 200, according to some example embodiments. The proxy communication 200 includes a communication module 210, a data module 220, a conversion module 230, an analysis module 240, and a presentation module 250. All, or some, of the modules are configured to communicate with each other, for example, via a network coupling, shared memory, a bus, a switch, and the like. It will be appreciated that each module may be implemented as a single module, combined into other modules, or further subdivided into multiple modules. Any one or more of the modules described herein may be implemented using hardware (e.g., a processor of a machine) or a combination of hardware and software. Other modules not pertinent to example embodiments may also be included, but are not shown.

The communication module 210 is configured to perform various communication functions to facilitate the functionality described herein. For example, the communication module 210 may communicate with the social networking system 120 via the network 140 using a wired or wireless connection. The communication module 210 may also provide various web services functions such as retrieving information from the third party servers 146 and the social networking system 120. In this way, the communication module 220 facilitates the communication between the proxy communication system 200 with the client devices 150 and the third party servers 146 via the network 140. Information retrieved by the communication module 210 may include profile data corresponding to the user 160 and other members of the social network service from the social networking system 120.

The data module 220 is configured to provide various data functionality such as exchanging information with databases or servers. For example, data module 220 may (access email templates, access member data from various databases including member activity and behavior data 132, social graph data 130, and profile data 138, generates and updates the shared table to include member ID, phone number, and proxy email address associated with the member. Further, the data module 220 may also extract attributes and/or characteristics from the profile data of member profiles. The data module 220 also stores template identifiers associated with email at databases associated with the social networking system 120, such as database 132, 130, 128, and other third party servers, the template identifiers flagging portions of text in the email to be associated with one or more category, the categories including email subject matter, summary, actionable item, key words, email body, and the like. Similarly, the data module 220 may access social graph data, member activity and behavior data from respective databases 130 and 132. In some example embodiments, the data module 220 may exchange information with third party servers 146, client devices 150, and other sources of information.

The conversion module 230 is configured to provide various conversion functionality such as extracting email content, generating hyperlinks, and generating short messages from the extracted email content and hyperlinks, where the links are hyperlinks are reference to data that can be directly followed either by clicking or by hovering over text, selectable interface, or icon associated with the links. In an embodiment, the conversion module 230 identifies the template identifiers associated with the email content and extracts the text (e.g., words, phrases, sentences) associated with each template identifiers. These template identifiers include email subject identifier, summary identifier, actionable item identifier, key word identifier, and the like. Based on the template identifiers, the conversion module 230 extract the email content and generate a short message from the email content. In some embodiments, the short message includes a selectable user interface with a hyperlink in order to render the dedicated content of the actionable item in a mobile application or web page. Details of the generation of a short message from an email are further described in association with FIGS. 4 and 5 below.

The analysis module 240 is configured to determine a communication channel to deliver the generated short message generated by the conversion module 230. The analysis module 240 analysis the member activity data and behavior data to determine which communication channel the member predominantly actively engages (e.g., reads the message and indicates the member has read by clicking a hyperlink appended to the message) with the most. Various communication channels include text-messaging channels (e.g., SMS messages, MMS, EMS, IM, and so forth), other messaging applications (e.g., WhatsApp, WeChat, and the like), push notification or other similar types of notification. In some embodiments, the level of active engagement is determined by the percentage in which the member actively engages with the message sent through a specific communication channel out of all the messages sent through that specific communication channel.

In various implementations, the presentation module 250 presents or causes presentation of information (e.g., visually displaying information on a screen, acoustic output, haptic feedback). Interactively presenting information is intended to include the exchange of information between a particular device and the user of that device. In an example, the presentation module 250 presents short messages generated by the proxy communication system to the client device 150. In other embodiments, the presentation module 250 interacts with third party servers 146 and third party applications 148 to cause the generated short message to be presented to the client device 150. For example, short messages to be presented via third party servers include third party applications (e.g., such as WhatsApp, SMS, and the like), where third party servers associated with WhatsApp causes presentation of the short message to the client device 150. The user of the client device 150 may provide input to interact with a user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 250 provides many other user interfaces to facilitate functionality described herein. The presentation module 250 causes presentation of the short message generated by the conversion module 230 using the communication channel selected by the analysis module 240. Further, it will be appreciated that "presenting" as used herein is intended to include communicating information or instructions to a particular device that is operable to perform presentation based on the communicated information or instructions via the communication module 210, data module 220, conversion module 230, and analysis module 240.

Figure 3:
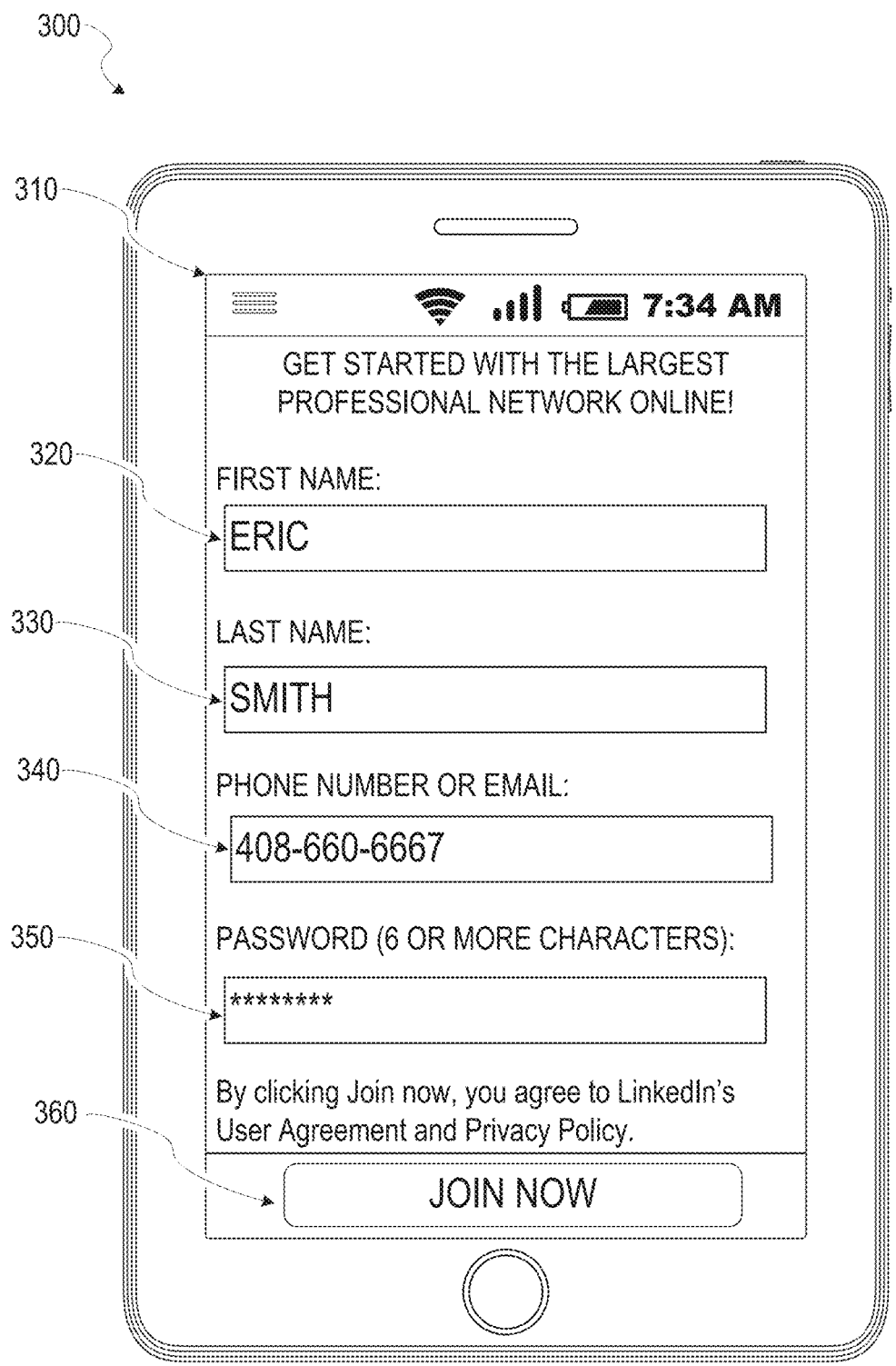
FIG. 3 illustrates an example user interface for a member who initially registers without an email address, according to some example embodiments.

FIG. 3 depicts an example device 300 (e.g., smart phone) displaying an example user interface 310 that includes interactive user interface elements such as input fields and other interface elements, according to some example embodiments. The user interface 310 allows a potential member to initially register and become a member of the social networking service, where the member provides a phone number, rather than an email, as a point of contact. In various example embodiments, the presentation module 250 causes presentation of the user interface 310 to potential members who desires to register to become a member of the social networking service. In an example embodiment, a potential member can initially register to become a member of the social networking service by providing personal information in input fields 320, 330, 340, 350, and selecting interface element 360 to join using the information provided in the input fields. In a specific example, input field 320 includes the first name Eric, input field 330 includes the last name Smith, input field 340 includes a phone number, and input field 350 includes a password associated with the potential member Eric Smith. In response to the potential member providing information to the input fields 320, 330, 340, 350 and selecting interface element 360, the social networking system 120 assigns a member identifier to the member Eric Smith. The proxy communication system 200 assigns a proxy email address to the member Eric Smith. A proxy email address is assigned to a member that does not have a registered email address as the point of communication. In some embodiments, the proxy email address is not member facing (e.g., there is no email inbox that the member being assigned the proxy email address could check emails being sent to their proxy email address. Rather, the member depends on the proxy communication system 200 to forward the emails being sent to the proxy email address to selected communication channels such as SMS). The proxy email address is utilized in the back end server system as an internal token to be associated with a member to satisfy algorithm flow dependencies of the system.

Referring back to FIG. 3, as the member selects interface element 360, the data module 220 inputs the new member information to an existing shared table that includes a mapping of the member identifier to the specific member, proxy email, and phone number. The data module 220 stores the shared table with the new member information in database 128. In some example embodiments, the proxy email address is not an actual email address where the member can access an inbox and check the email being sent to the proxy email address. Alternatively, a proxy email address can be an actual email address where members can access all emails sent to the proxy email address. In these example embodiments, the user interface elements provide potential members a means to initially register to a social networking service through a third-party application running on a mobile device (e.g., a social network service app running on a smart phone of the user), or a mobile web application, and the like. To this end, assigning a proxy email address to a member that does not have a personal email address allows phone-only members to register and access services provided by the social networking service providers while maintaining the back end infrastructure of the email dependencies of the social networking system. Emails generated by the social networking system to engage and communicate with members are subsequently intercepted by the proxy communication system 200, filtered to identify critical messages that are converted to a shorter message (e.g., more appropriate for presentation at a mobile device while maintain the important content of the original email) and subsequently send to a communication channel determined to be most engaging to the specific member. In example embodiments, the communication channel can be in example form of push notification, instant messenger (IM), short message services (SMS) messages, Multimedia Messaging Service (MMS), Enhanced Messaging Service (EMS), or other similar types of notifications and messaging systems. In some example embodiments, the communication channel is an in-app notification such as a notification provided via a third-party application running on a mobile device (e.g., a social network service app running on a smart phone of the user). Email conversion to short message form, the short message subsequently being presented to a member device is described in further detail in association with FIG. 4 below.

Figure 4:
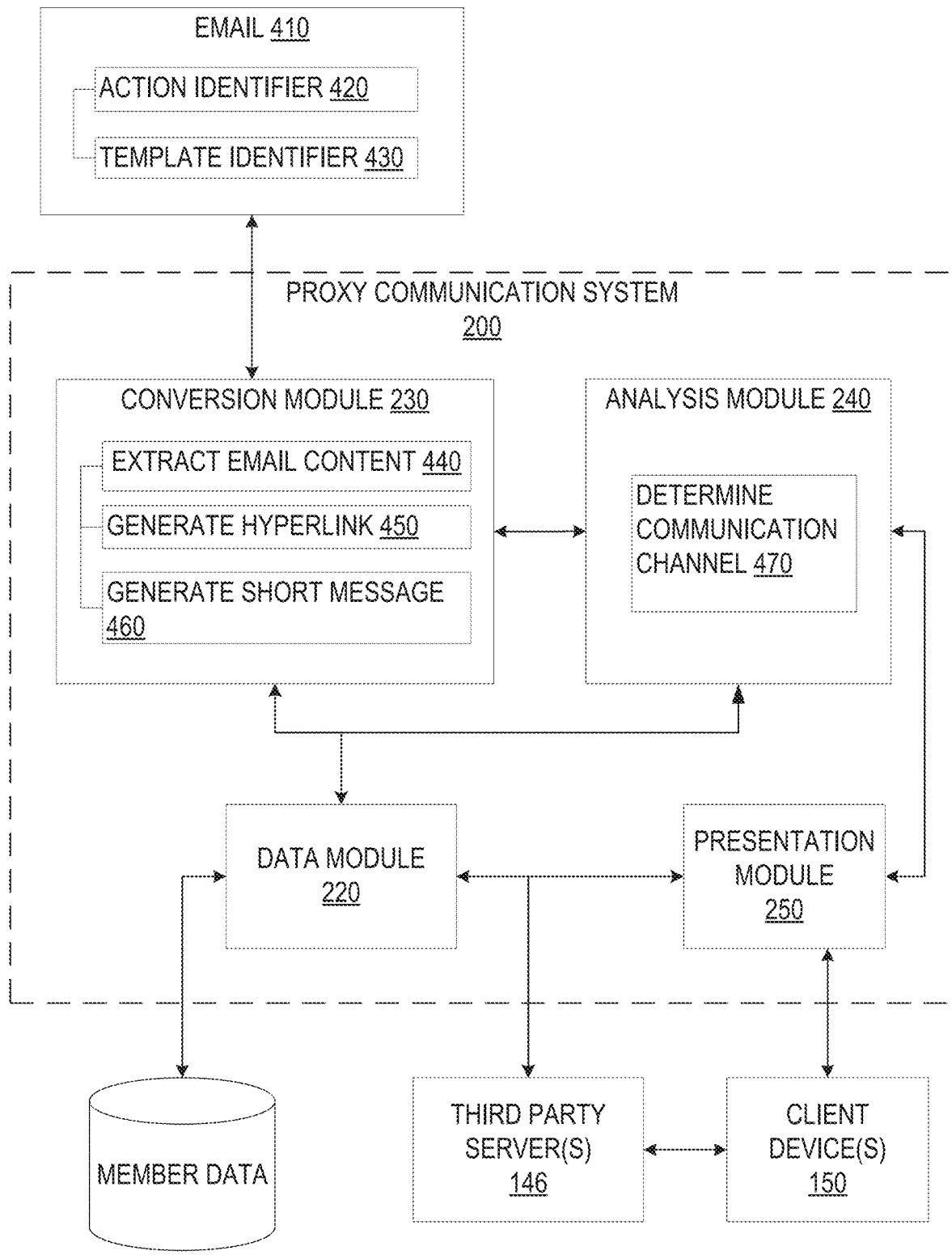
FIG. 4 is a block diagram illustrating an example implementation of the notification system of FIG. 2, according to some example embodiments.

FIG. 4 is a block diagram illustrating an example implementation of the proxy communication system 200. In an example embodiment, the proxy communication system 200 receives email 410 generated by various modules and servers of the social networking system 120 to he sent to a specific member. The email 410 can include, for example, routine transaction engagement messages (e.g., other members sending the specific member an invite to connect, an invitation to the specific member to endorse other members, or job application status update applied via the social networking system).

In some example embodiments, the email 410 can include an action identifier 420 indicating that the email contains important information for the member and therefore should be passed along to the member. In some examples, the action identifier 420 is included in the email based on the presence of actionable items included in the content of the email. Actionable items include information that request specific actions from the user. For instance, if the email content includes suggesting a member to endorse a colleague connected to the member via LinkedIn, then the actionable item is to request a member action of endorsing. In this example, the email is flagged with an action identifier based on the actionable item. In other examples, the action identifier 420 is included in the email based on the status (e.g., new members, frequent members, infrequent members, and the like) of the member in the online social network. The experience that members seek from online social network differs depending on their status and therefore seek specific types of communication from the online social network providers depending on their status. In an example, a new member would seek to build their network and online profile and therefore sending messages suggesting other members to connect with would lead to a better new user experience than suggesting endorsements for other members in the network. In this example, if the member is a newly registered member, then emails associated with building the member network and member profile are flagged with an action identifier.

In various embodiments, the social networking system 120 generate the email 410 based on email templates with predefined template identifiers 430 specifying the content added to each section in the email template. These email templates are stored in various databases including member data 132, 130, and 128, and third party servers 146. The layout of the email templates can include sections being specified with template identifiers 430 such as key word identifier, summary identifier, heading identifier, email subject identifier, actionable item identifier (e.g., item requesting specific actions from the user such as the act of endorsing a friend), hyperlink identifier, and the like. In an example, in an email, certain words are flagged by key word identifiers to indicate important words. Another section of the email is flagged with the summary identifier to indicate a brief statement regarding the purpose of the email. Other sections are flagged with the actionable item identifier to indicate an action that is requested from the user. In a specific example, an actionable item identifier can be associated with the sentence: "You have two endorsements from your connection Shawn! Would you like to add the two endorsements to your profile?" Other texts are also included in this email such as the types of endorsements received and information about the connection Shawn. In some embodiments, the same text (e.g., words, phrases, or sentences) can be flagged with multiple template identifiers. Referring back to the previous actionable item identifier example, the sentence "You have two new endorsements from your connection Shawn!" can also be flagged with the summary identifier in addition to the actionable item identifier, where the purpose of the email is to inform the user that they have two new endorsements.

In various embodiments, the conversion module 230 receives the email 410 and determines an action identifier associated with the email 410. Next, the conversion module 230 determines the length of the email. Emails that are determined to be longer than a predetermined threshold continue to be converted to short message form by the conversion module 230.

In various embodiments, the conversion module 230 generates a short message based on the received email. The generated short message aims to preserve the main content of the email while providing enough content to the member to induce further interactions. The conversion module 230 generates a short message by first extracting content from the forward mails (e.g., mails identified to contain the action identifier 420) in order to preserve the important content of the email. In some embodiment, emails that do not possess an action identifier are not converted to short message form. In yet other embodiments, all emails are converted to the short message form. In order to extract email content 440, the conversion module 230 detects the template identifiers 430 from the email 410 and extracts the plain text associated with the template identifiers including email subject identifier, summary identifier, actionable item identifier, key word identifier, and the like. The operations of extracting content from an email and converting the email into a short message for delivery effectively proxies email into additional communication channels. As a result, the operations of extracting and converting enhances the communication capabilities of the social networking system.

In various embodiments, the conversion module 230 generates a hyperlink 450 for each associated actionable item. The hyperlink can be in example form of a uniform resource identifier (URI) or uniform resource locator (URL) that links to a specific location within a mobile application (e.g., deep linking consisting of using a URI that links to a specific location within a mobile application) or a hyperlink that links to a specific piece of web content on a website. Clicking on a hyperlink initiates a launch of the associated mobile application or web page (if the application is not installed on the mobile device) that is responsible for rendering the dedicated content of the actionable item. In a specific example shown in FIG. 8, the selectable user interface 830 has an associated hyperlink where selecting on the interface 830 launches the application to allow the user to endorse the connection Sam Draper. From the identified template identifiers 430, the conversion module 230 creates a hyperlink where the user selecting on a dedicated user interface would initiate a launch to a mobile application to render the content of the actionable item. In some embodiments, the user interface would have an associated keyword (based on the key word identifier) associated with the actionable item, allowing the user to know what the actionable item entails. The hyperlink can be associated with various icons where selecting the icon will launch a window to render the content associated with the hyperlink. Hyperlinks associated with an actionable item are described in further detail in association with FIGS. 8 and 9 below.

In various embodiments, the conversion module 230 generates the short message 460 using the extracted email content 440. In some embodiments, the short message includes the extracted email content 440 and the generated hyperlink 450. The conversion module 230 determines the length of the email 410 based on a word count. If the length of the email 410 is determined to be longer than a threshold (word count threshold), then the conversion module 230 initiates the conversion of the email 410 to generating a short message 460 from the long email 410. For example, a threshold can be pre-set to be fifteen words due to limitations of mobile device screen sizes. Any email 410 determined to be longer than the threshold (fifteen words) are converted to the short message form. The short message is formed from any combination of the extracted email content 440. In some embodiments, the short message is formed from a combination of extracted email content 440 based on the text associated with the email subject identifier and the summary identifier. In other embodiments, the short message is formed from a combination of extracted email content 440 based on the text associated with the email subject identifier and actionable item identifier. In yet other embodiments, the short message is formed using a short message template that include certain keywords extracted from the key word identifier, the short message template consisting of pre-defined template identifiers at certain locations to be combined in order to form a short message.

In various embodiments, the analysis module 240 determine a communication channel 470 to deliver the generated short message 460 to the client device 150. When selecting an alternative channel for delivering the short message (e.g., "proxied" message), the analysis module 240 will leverage propensity models that analyze a user's behavior and activity on the social platform. In an example, the analysis module analyzes behavior information in determine whether a user is more likely interact with a first communication channel versus a second communication channel (e.g., is the user more likely to open a push notification than an instant message). The analysis module 240 determines a communication channel to best contact the member using member activity data and behavior data accessed by the data module 220. Member activity data and behavior data can also be accessed by the data module 220 from third party servers 146. Various communication channels include text-messaging channels (e.g., SMS messages, MMS, EMS, IM, and so forth), other messaging applications (e.g., WhatsApp, WeChat, and the like), push notification or other similar types of notification. In example embodiments, the analysis module 240 selects a communication channel by determining which communication channel the member actively engages (e.g., reads the message and indicates the member has read by clicking a hyperlink appended to the message) with the most based on past member profile data. The analysis module 240 determines the percentage in which the member actively engages with short messages being sent through each communication channel and selects the communication channel with the highest percentage of active engagement. For example, the analysis module 240 determines that the member only actively engages with push notifications for one percent of the time and the member has actively engaged with SMS forty percent of the time (e.g., the user actively engages with the message four times out of ten times that the short message is sent via SMS). In this example, the analysis module 240 selects the SMS communication channel to send the generated short message 460.

In other embodiments, the analysis module 240 continuously monitors the level of active engagement. If the percentage of active engagement falls below a threshold, the analysis module 240 selects another communication channel to send the short message. For example, continuing with the last example, if the percentage of active engagement for the SMS communication channel falls from forty percent down to five percent (with a threshold of ten percent), then the analysis module 240 selects a different channel (second channel of communication). In other words, the percentage of active engagement fails to transgress the threshold of ten percent, therefore a different channel of communication is selected to send current and subsequent messages. The level of active engagement may fall significant due to the user choosing to block all communication through that specific channel. For example, a member finds that push notifications are noisy and interruptive and therefore chooses to block all push notifications. Optionally, the analysis module 240 may select a channel with no member data (i.e., no or little information about user engagement with a particular channel) in order to collect data points, where the known levels of active engagement for their respective communication channels are below the threshold. For example, continuing with the previous example, where the level of active engagement of the SMS communication channel falls to five percent, and the only other data the data module 220 has is the one percent engagement via push notification, then the analysis module 240 may select a different communication channel such as other messaging applications (e.g., WhatsApp). The different communication channel (e.g., WhatsApp) will have an active engagement percentage that is higher than the first communication channel (e.g., SMS). After the analysis module 240 selects the communication channel 470, the presentation module 250 causes the generated short message 460 to be presented to the client device 150 via the selection communication channel 470. In other embodiments, the presentation module 250 interacts with third party servers 146 and third party applications 148 to cause the generated short message to be presented to the client device 150. For example, short messages to be presented via third party servers include third party applications (e.g., such as WhatsApp, SMS, and the like), where third party servers associated with WhatsApp causes presentation of the short message to the client device 150.

Figure 5:
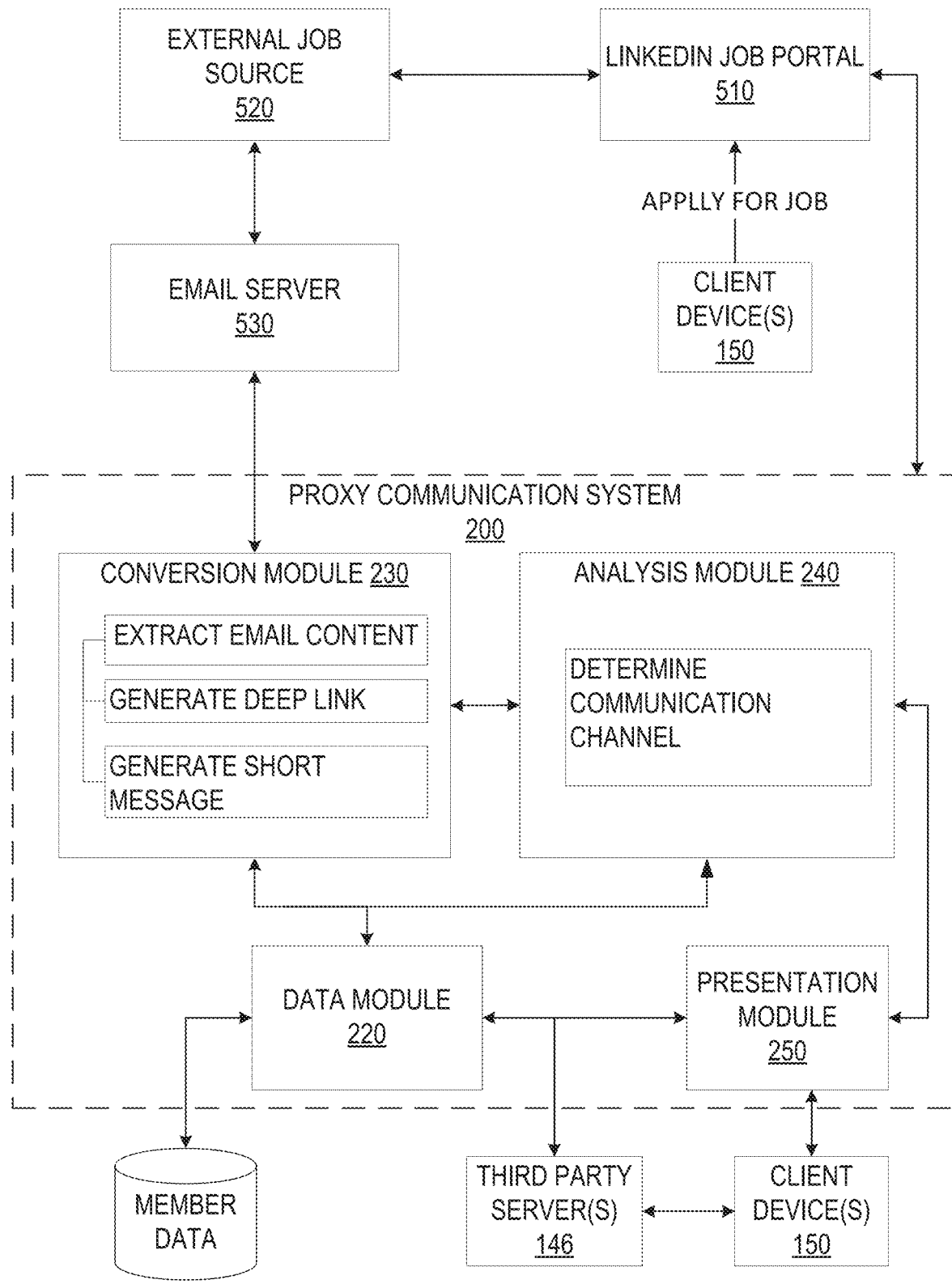
FIG. 5 is a block diagram illustrating another example implementation of the notification system of FIG. 2, according to some example embodiments.

FIG. 5 is a block diagram illustrating an example implementation of the proxy communication system 200. In an example embodiment, a member without an email address applies to a job from the client device 150, via the LinkedIn job portal 510. It is appreciated that LinkedIn job portal 510 can be representative of any sort of job portal allowing users to apply for jobs and not specific to a specific portal. Since an external job source 520 (e.g., companies seeking a candidate for a specific job) requires an email address for each candidate that applies, the proxy communication system 200 provides the external job source 520 a proxy email address associated with the member via the email server 530. In example embodiments, the external job source 520 receives the proxy email address associated with the candidate via the LinkedIn job portal 510. Email communications directed to the candidate from the external job source 520 (i.e., via the proxy email address) are received by email server 530. The conversion module 230 access the email server 530 to extract the email content, generate a hyperlink, generate a short message of the email. The hyperlink can include a link to the full content of the email sent by the external job source 520. The steps of extracting the email content, generating a hyperlink, and generating the short message has been fully described in association with FIG. 4 above. The analysis module 240 determines the communication channel to best send to the user and the presentation module 250 presents the short message to client device 150. The steps of determining the communication channel and presenting the short message has been fully described in association with FIG. 4 above.

Figure 6:
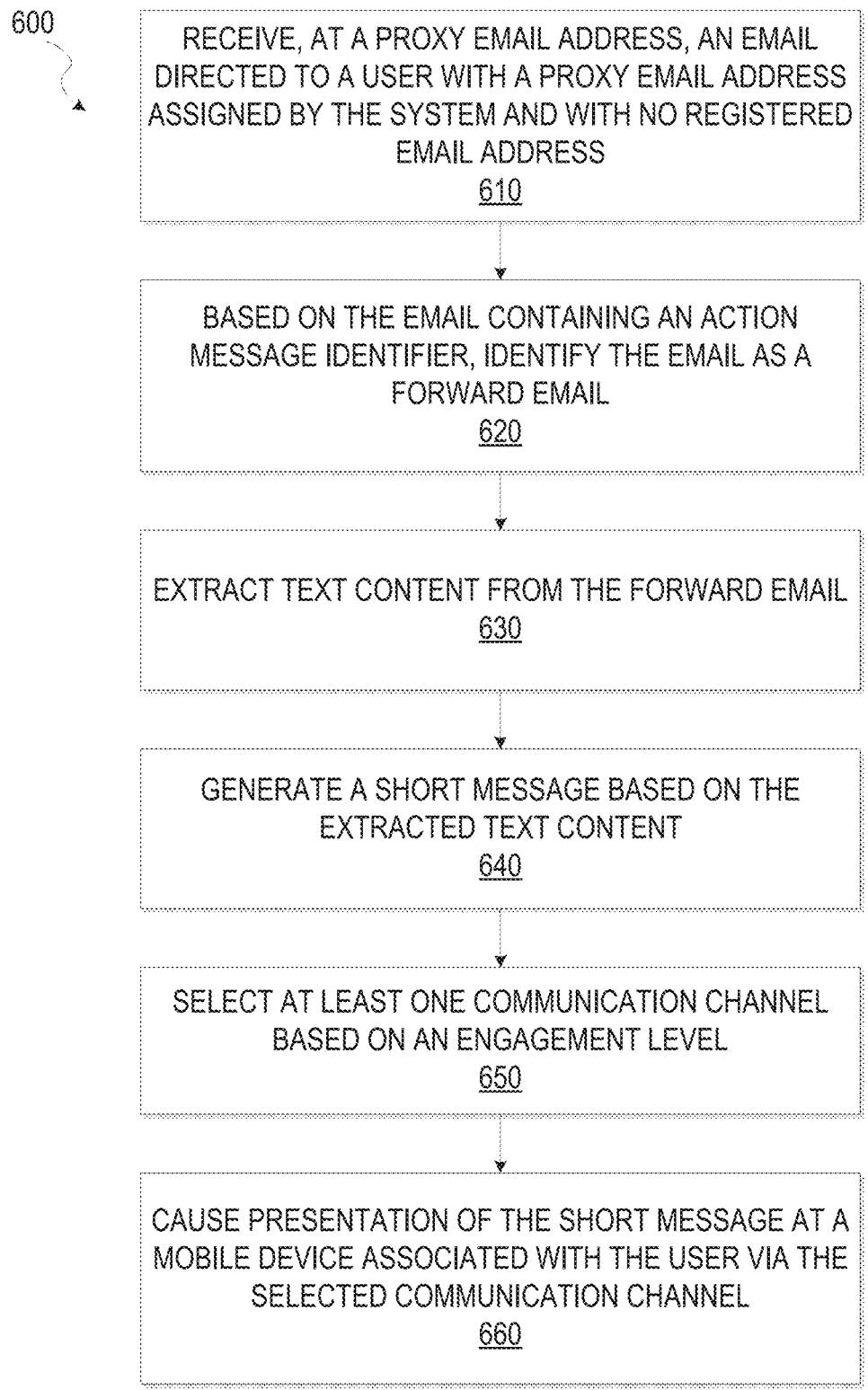
FIG. 6 is a flow diagram illustrating an example method for communicating email content to a member without a registered email address, according to some example embodiments.

FIG. 6 is a flow diagram illustrating an example method 600 for communicating email content to a member without a registered email address, according to example embodiments. The operations of the method 600 may be performed by components of the proxy communication system 200. At operation 610, the conversion module 230 receives, at a proxy email address, an email directed to a user with a proxy email address assigned by the system and with no registered email address. The proxy email address is assigned by the system for a user, where the user had registered to become a member of a social network using a phone number and no email address. A proxy email address is an email assigned by the proxy communication system to a user, where the user has not added a registered email address to their member profile. A registered email address identifies an email box, which email messages are to be delivered to the member, where the email box is located at other third party servers 146, outside the social networking system 120. An assigned proxy email address on the other hand is an email box located internally within the social networking system 120.

At operation 620, the conversion module 230 based on the email containing an action message identifier, identifies the email as a forward email. First, the conversion module 230 ascertains whether or not the email contains an action message identifier. As fully described above in association with FIG. 4, the email includes an action message identifier flagging the email as important and therefore should be sent to the user. As described above, forward emails are flagged as important, therefore to be forwarded, externally by the system that generates the associated proxy emails within the social networking system. In other embodiments, the conversion module 230 identifies an email as important based on the email including predefined template identifiers, such as actionable identifiers, summary identifiers, key word identifiers, and the like. At operation 630, the conversion module 230 extract text content from the forward email. At operation 640, the conversion module 230 generates a short message based on the extracted text content, as described fully above in association with FIG. 4. At operation 650, the analysis module 240 selects at least one communication channel to send the short message based on an engagement level associated with the at least one communication channel. The engagement level is determined from previous interactions by the user with the respective communication channel. These communication channels include text-messaging channels (e.g., SMS messages, MMS, EMS, IM, and so forth), other messaging applications (e.g., WhatsApp, WeChat, and the like), push notification or other similar types of notification. The communication channel is chosen based on having the highest level of member engagement (e.g., the member reads the message and actively engages with the short message by clicking a link associated with the message). At operation 660, the presentation module 250 causes presentation of the short message at a mobile device associated with the user via the selected communication channel. For example, a user is presented with a short message via the LinkedIn application on a mobile device. Short messages to be presented via third party servers may include third party applications (e.g., such as WhatsApp, SMS, and the like), where third party servers associated with WhatsApp causes presentation of the short message to the client device 150. In other embodiments, the presentation module 250 interacts with third party servers 146 and third party applications 148 to cause the generated short message to be presented to the client device 150. In another embodiment, where the user does not interact with the current message being sent, after a predetermined period of time has elapse, a different channel of communication may be used to send the same message.

Figure 7:
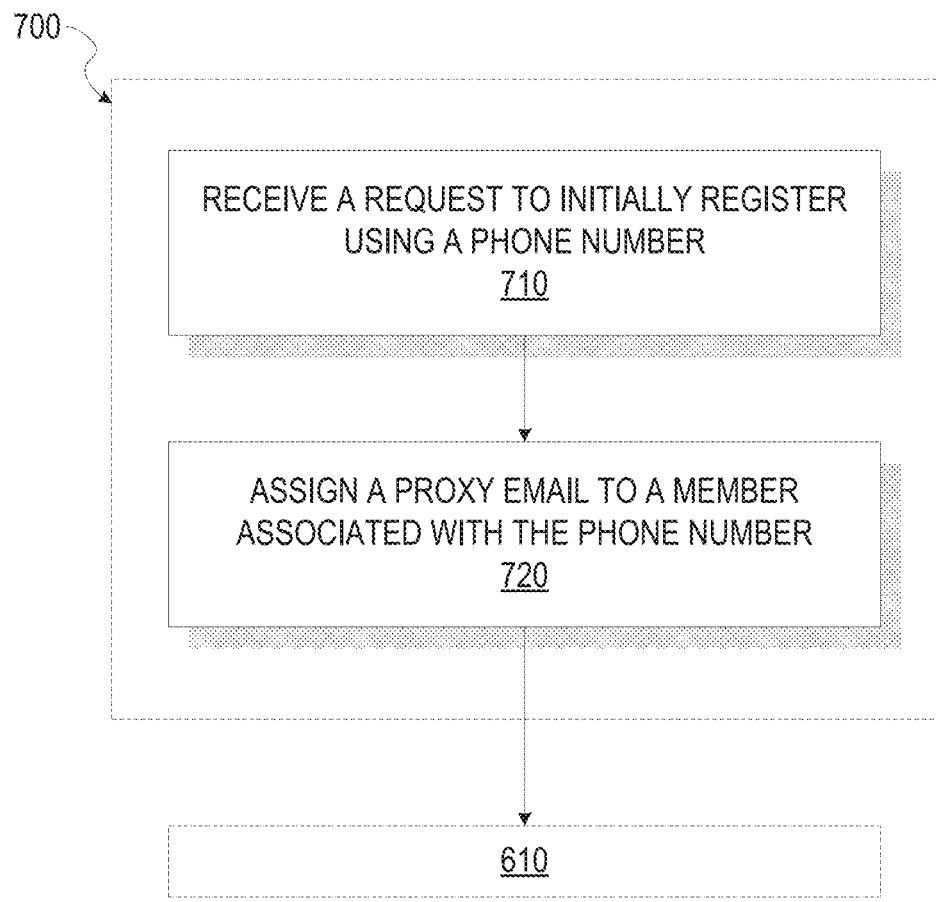
FIG. 7 is a flow diagram illustrating an example method for assigning a proxy email address to a member who initially registers using a phone number, according to some example embodiments.

FIG. 7 is a flow diagram illustrating an example method 700 for assigning a proxy email address to a member who initially registers using a phone number, according to example embodiments. The operations of the method 700 may be performed by components of the proxy communication system 200. At operation 710, the proxy communication system 200 receives a request to initially register using a phone number. The request is associated with a potential member requesting to initially register to become a member of the social networking service by providing personal information such as a phone number in order create a member profile. At operation 720, the proxy communication system 200 assigns a proxy email address to a member associated with the phone number. The proxy email address satisfies the infrastructure decencies of the social networking system 120 on having an email associated with each member. In this way, assigning a proxy email address to a member that does not have an email address allows the member to take full advantage of the functionalities of the social networking system 120 and at the same time, not requiring a complete infrastructure change of the social networking system 120. Additionally, the proxy communication system 200 also assigns a member identifier to the member.

Figure 8:
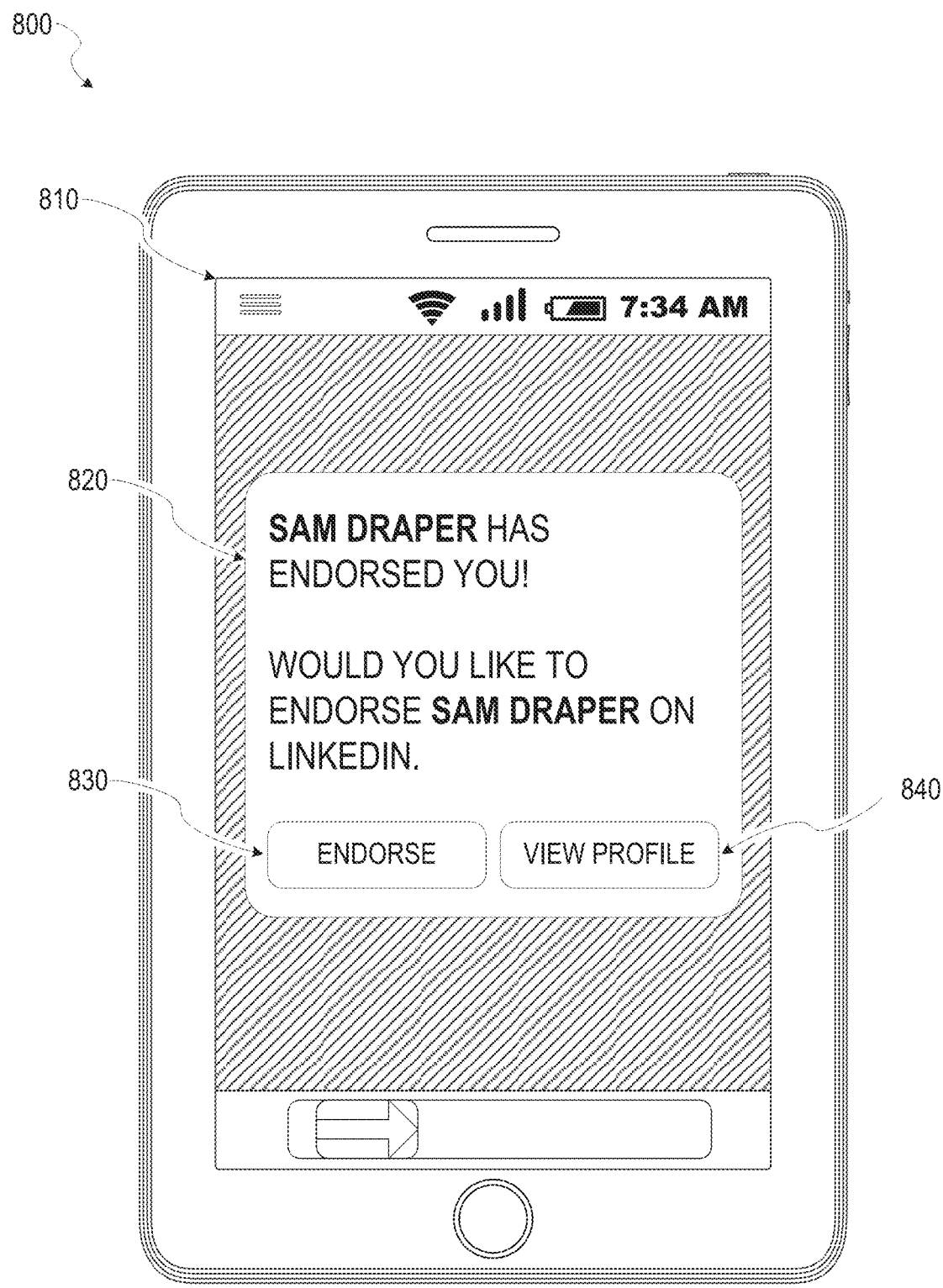
FIG. 8 illustrates an example user interface that includes a short message, according to some example embodiments.

FIG. 8 depicts an example device 800 (e.g., smart phone) displaying an example user interface 810 that includes a short message 820, according to some example embodiments. In various example embodiments, the presentation module 250 causes presentation of the short message 820 to the user. For instance, the presentation module 250 communicates, to the device 800, instructions to present the short message 820. In some instances, the instructions include message content, generated by the conversion module 230, via the communication channel determined by the analysis module 240, to be presented to the member. In example embodiments, the short message 820 comprises a text message being sent through text messaging channels such as SMS messages, MMS, EMS, and so forth. In other example embodiments, the short message 820 is sent using a push notification or another similar type of notification. In an example, the short message 820 is presented to the member in the form of a push notification based on the determination by the analysis module 240 that push notification maximizes user interaction. In further example embodiments, the short message 820 comprises interactive user interface elements such as user interface elements 830 and 840. In these example embodiments, the user interface elements 830 and 840 provide the user an option to make a selection (e.g., through an SMS system, mobile application, web page, and so forth). The user interface elements 830 and 840 have hyperlinks associated with the elements. When a member selects the inter face elements, the associated hyperlink initiates a launch of the associated mobile application or web page (if the application is not installed on the mobile device) that is responsible for rendering the dedicated content of the actionable item. For instance, the actionable item associated with interface elements 830 is to endorse the connection Sam Draper. In this example, when the member clicks on interface elements 830, the associated hyperlink launches the mobile application to render the content related to endorsing the connection Sam Draper, further discussed in association with FIG. 9 below.

Figure 9:
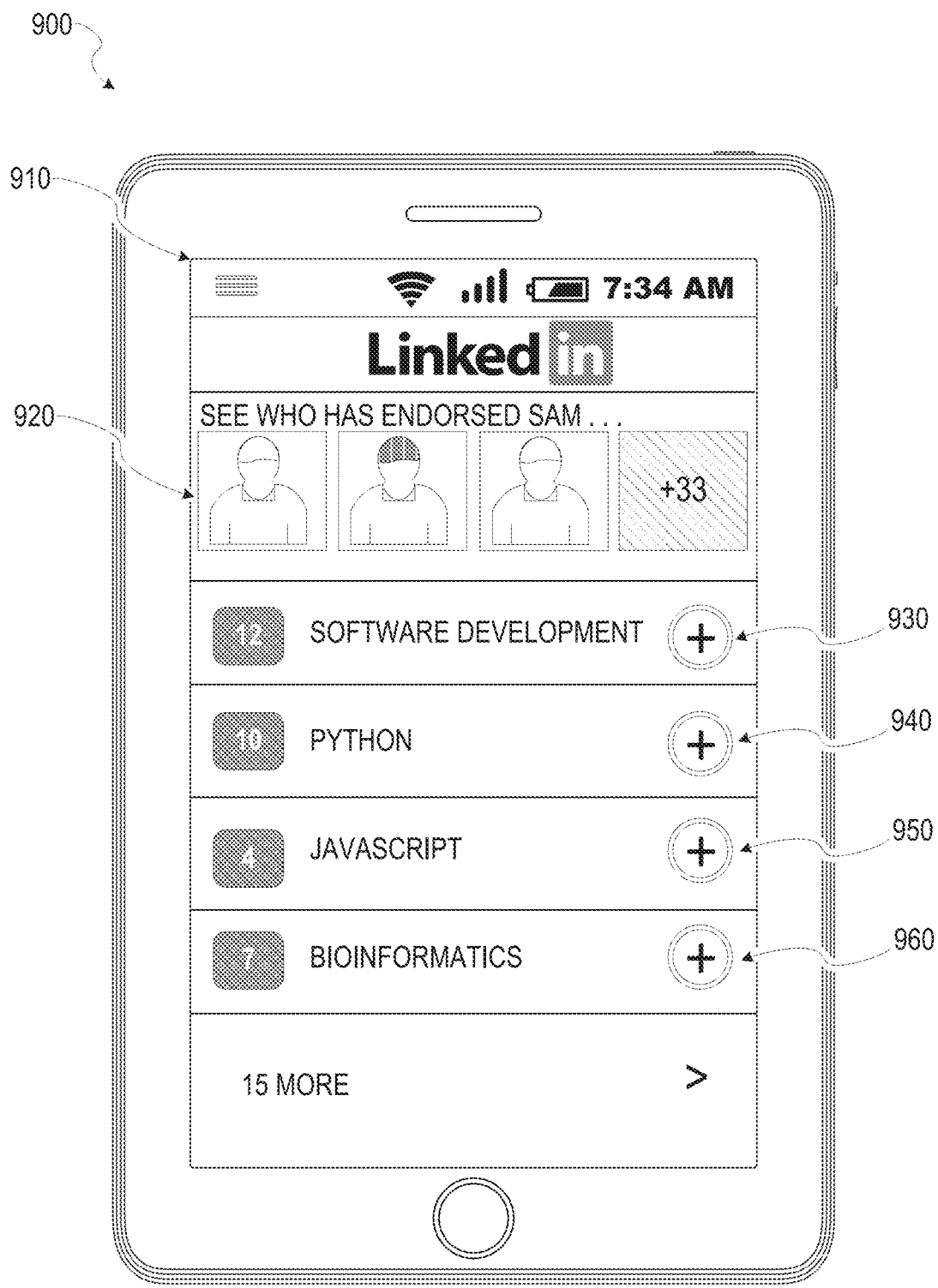
FIG. 9 illustrates an example user interface, according to sonic example embodiments.

FIG. 9 depicts an example device 900 (e.g., a smart phone) displaying an example user interface 910 that includes an interface element 920, and actionable items 930, 940, 950, and 960, according to some example embodiments. The user interface 910 is launched through a mobile application, in response to the member selecting the user interface 830, which has a hyperlink to launch the actionable items associated with endorsing the connection Sam Draper. In some example, user interface 910 was available to the member in the original email content but was not identified as essential to be part of the short message 820. The member can endorse by selecting actionable items 930, 940, 950, or 960 to endorse the associated skills or expertise of the Sam Draper. Further, the member can also view the other thirty-six members of the online social network who have endorsed Sam Draper for the presented skill sets.

Modules, Components, and Logic

Figure 10:
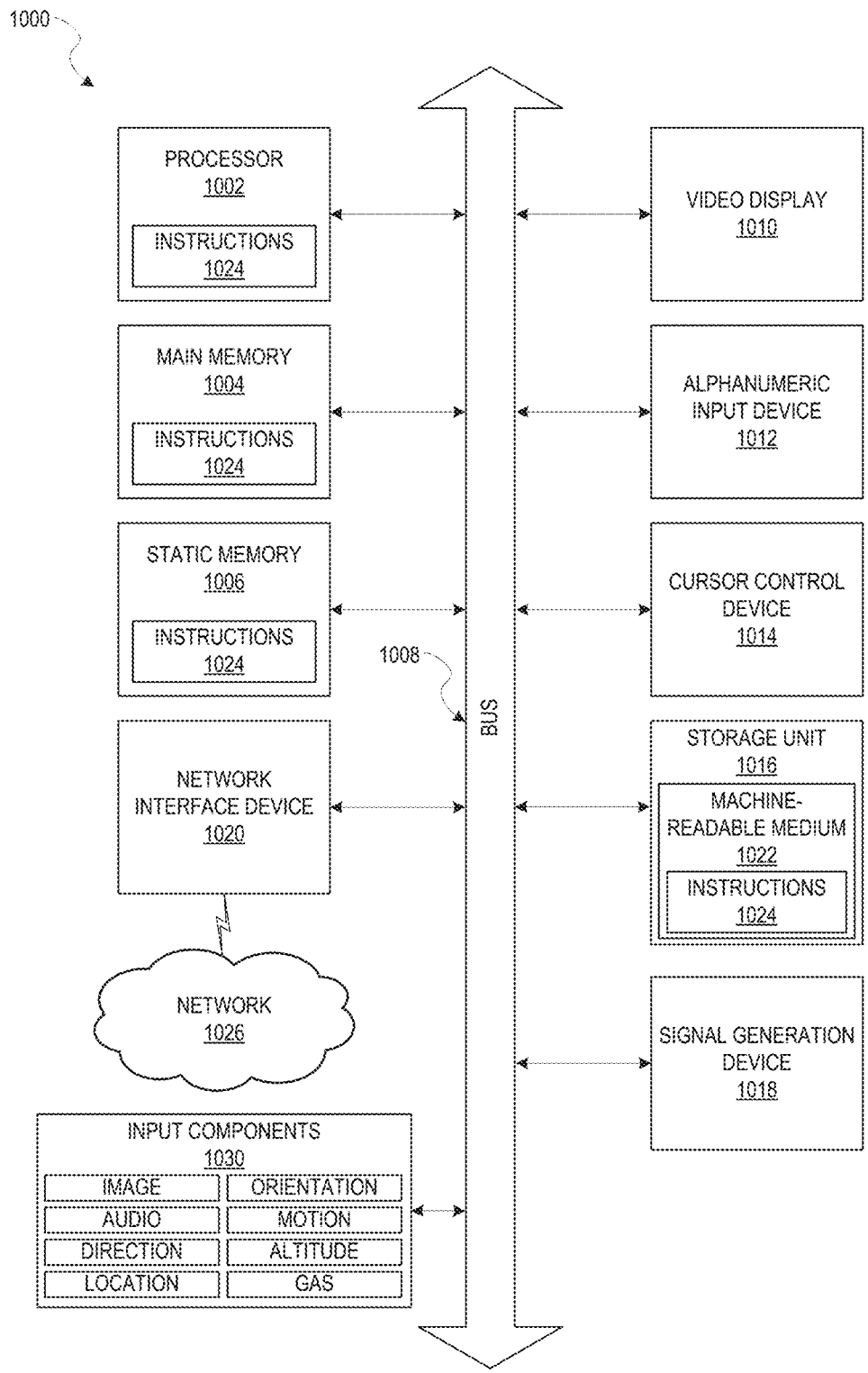
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1024 (e.g., software, a program, an application, an applet, an app, or other executable code) for causing the machine 1000 to perform any one or more of the methodologies, associated with the service provider system 200, discussed herein may be executed. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Any of these machines can execute the operations associated with the service provider system 200. Further, while only a single machine 1000 is illustrated, the term "machine" shall also be taken to include a collection of machines 1000 that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a video display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or all three, during execution thereof by the machine 1000. Accordingly, the main memory 1004, static memory 1006 and the processor 1002 may be considered as machine-readable media 1022. The instructions 1024 may be transmitted or received over a network 1026 via the network interface device 1020.

In some example embodiments, the machine 1000 may be a portable computing device, such as a smart phone or tablet computer, and have one or more additional input components 1030 (e.g., sensors or gauges). Examples of such input components 1030 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component one or more accelerometers), an altitude detection component (e.g., an altimeter), and a gas detection component (e.g., a gas sensor) inputs harvested by any one or more of these input components may be accessible and available for use by any of the modules described herein.

As used herein, the term "memory" refers to a machine-readable medium 1022 able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing instructions (e.g., instruction 1024) for execution by a machine (e.g., machine 1000), such that the instructions, when executed by one or more processors of the machine 1000 (e.g., processor 1002), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 1022 is non-transitory in that it does not embody a propagating signal. However, labeling the machine-readable medium 1022 as "non-transitory" should not be construed to mean that the medium is incapable of movement; the medium should be considered as being transportable from one physical location to another. Additionally, since the machine-readable medium 1022 is tangible, the medium may be considered to be a machine-readable device.

The instructions 1024 may further be transmitted or received over a communications network 1026 using a transmission medium via the network interface device 1020 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1022 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 1002, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at leak partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions described herein. As used herein, "processor-implemented module" refers to a hardware module implemented using one or more processors 1002.

Similarly, the methods described herein may be at least partially processor-implemented, with a processor 1002 being an example of hardware. For example, at least some of the operations of a method may be performed by one or more processors 1002 or processor-implemented modules. Moreover, the one or more processors 1002 may also operate to support performance of the relevant operations in a "cloud computing" environment or as a "software as a service" (SaaS). For example, at least some of the operations may be performed by a group of computers (as examples of machines 1000 including processors 1002), with these operations being accessible via the network 1026 (e.g., the Internet) and via one or more appropriate interfaces (e.g., an application program interface (API)).

The performance of certain of the operations may be distributed among the one or more processors 1002, not only residing within a single machine 1000, but deployed across a number of machines 1000. In some example embodiments, the one or more processors 1002 or processor-implemented modules may be located in a single geographic location (e.g., within a home environment, an office environment, or a server farm). In other example embodiments, the one or more processors 1002 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   a processor, and a memory including instructions, which when executed by the processor, cause the processor to:
   receive, at a proxy email address, an email directed to a user with a proxy email address assigned by the system;
   ascertain whether or not the email contains an action message identifier indicating that the email should be converted to a text message;
   based on the email containing an action message identifier, identify the email as a forward email;
   extract text content from the forward email;
   generate a short message based on the extracted text content;
   select at least one communication channel to send the short message; and
   cause presentation of the short message at a mobile device associated with the user via the selected at least one communication channel.

2. The system of claim 1, further comprising:
   generate a uniform resource locator (URL) link based on the extracted text content; and
   include a selectable interface representing the URL link in the short message.

3. The system of claim 2, further comprising:
   in response to the selectable interface being selected, launch a window to render the content associated with the URL link.

4. The system of claim 1, further comprising:
   receive a request to initially register using a phone number; and
   assign a proxy email address to a member associated with the phone number.

5. The system of claim 1, wherein the generated short message is further based on the length of the email.

6. The system of claim 1, wherein the engagement level is determined, using historical information, by calculating a percentage of user interaction with previous short messages sent through the same communication channel.

7. The system of claim 1, further comprising:
   calculate a percentage of user interaction with previous short messages and the at least one communication channel;
   determine the percentage of user interaction fails to transgress a threshold; and
   select a different communication channel to send the short message.

8. The system of claim 7, wherein the different communication channel has an engagement level that exceeds an engagement level associated with the at least one communication channel.

9. The system of claim 1, wherein the at least one communication channel is a push notification, instant messenger, or short message service.

10. A method comprising:
    receiving, at a proxy email address, an email directed to a user with a proxy email address assigned by the system;
    ascertaining whether or not the email contains an action message identifier indicating that the email should be converted to a text message;
    based on the email containing an action message identifier, identifying the email as a forward email;
    extracting text content from the forward email;
    generating a short message based on the extracted text content, the generating being performed by at least one processor of a machine;
    selecting at least one communication channel to send the short message; and
    causing presentation of the short message at a mobile device associated with the user via the selected at least one communication channel.

11. The method of claim 10, further comprising:
    generating a uniform resource locator (URL) link based on the extracted text content; and including a selectable interface representing the URL link in the short message.

12. The method of claim 11, further comprising:
in response to the selectable interface being selected, launching a window to render the content associated with the URL link.

13. The method of claim 10, further comprising:
receiving a request to initially register using a phone number; and
assigning a proxy email address to a member associated with the phone number.

14. The method of claim 10, wherein the generated short message is further based on the length of the email.

15. The method of claim 10, wherein selecting is based on an engagement level determined, using historical information, by calculating a percentage of user interaction with previous short messages sent through the same communication channel.

16. The method of claim 10, further comprising:
calculating a percentage of user interaction with previous short messages and the at least one communication channel;
determining the percentage of user interaction fails to transgress a threshold; and
selecting a different communication channel to send the short message.

17. A non-transitory machine-readable medium that, when executed by at least one processor of a machine, cause the machine to perform operations comprising:
receiving, at a proxy email address, an email directed to a user with a proxy email address assigned by the system;
ascertaining whether or not the email contains an action message identifier indicating that the email should be converted to a text message;
based on the email containing an action message identifier, identifying the email as a forward email;
extracting text content from the forward email;
generating a short message based on the extracted text content;
selecting at least one communication channel to send the short message; and
causing presentation of the short message at a mobile device associated with the user via the selected at least one communication channel.

18. The machine-readable medium of claim 17, wherein the operations further comprise:
generating a uniform resource locator (URL) link based on the extracted text content; and
including a selectable interface representing the URL link in the short message.

19. The machine-readable medium of claim 17, wherein the operations further comprise:
receiving a request to initially register using a phone number; and
assigning a proxy email address to a member associated with the phone number.

20. The machine-readable medium of claim 17, wherein the operations further comprise:
calculating a percentage of user interaction with previous short messages and the at least one communication channel;
determining the percentage of user interaction fails to transgress a threshold; and
selecting a different communication channel to send the short message.

* * * * *